US 11,523,038 B1

(12) United States Patent
Nelson et al.

(10) Patent No.: US 11,523,038 B1
(45) Date of Patent: Dec. 6, 2022

(54) AERIAL VEHICLE WITH REPLACEABLE CAMERA MODULES

(71) Applicant: Sentera, Inc., Minneapolis, MN (US)

(72) Inventors: Ryan Nelson, Minneapolis, MN (US); Alex Stephens, Minneapolis, MN (US)

(73) Assignee: Sentera, Inc., St. Paul, MN (US)

(*) Notice: Subject to any disclaimer, the term of this patent is extended or adjusted under 35 U.S.C. 154(b) by 540 days.

(21) Appl. No.: 16/520,977

(22) Filed: Jul. 24, 2019

(51) Int. Cl.
*H04N 5/225* (2006.01)

(52) U.S. Cl.
CPC ..... *H04N 5/2257* (2013.01); *B64C 2201/123* (2013.01); *B64C 2201/127* (2013.01)

(58) Field of Classification Search
CPC ............ H04N 5/2257; B64C 2201/123; B64C 2201/127
See application file for complete search history.

(56) References Cited

U.S. PATENT DOCUMENTS

| 8,836,793 B1 | 9/2014 | Kriesel et al. |  |
| 2006/0170811 A1* | 8/2006 | Joung | H04N 5/22521 348/342 |
| 2007/0174895 A1 | 7/2007 | Zhigang et al. |  |
| 2007/0211164 A1 | 9/2007 | Olsen et al. |  |
| 2009/0244355 A1 | 10/2009 | Horie |  |
| 2012/0026325 A1 | 2/2012 | Bunker et al. |  |
| 2014/0098225 A1* | 4/2014 | Rodriguez | H04N 5/2254 348/370 |
| 2015/0172608 A1 | 6/2015 | Routhier et al. |  |
| 2015/0181098 A1 | 6/2015 | Davis et al. |  |
| 2015/0358527 A1 | 12/2015 | Niida |  |
| 2017/0078538 A1 | 3/2017 | Zhu et al. |  |
| 2018/0024419 A1 | 1/2018 | Sheridan |  |
| 2019/0222779 A1* | 7/2019 | Nelson | H04N 5/2258 |
| 2019/0227541 A1* | 7/2019 | Cantrell | G05D 1/0027 |

* cited by examiner

*Primary Examiner* — Anne Marie Antonucci
*Assistant Examiner* — Jingli Wang
(74) *Attorney, Agent, or Firm* — Hamre, Schumann, Mueller & Larson, P.C.

(57) ABSTRACT

An aerial vehicle system, such as an unmanned aerial vehicle, that includes a camera system with replaceable camera modules that have different spectral, optical and/or sensing characteristics from one another. By replacing one camera module with another camera module, different information can be gathered and analyzed by the camera system of the aerial vehicle system.

7 Claims, 4 Drawing Sheets

AERIAL VEHICLE WITH REPLACEABLE CAMERA MODULES

FIELD

Figure 1:
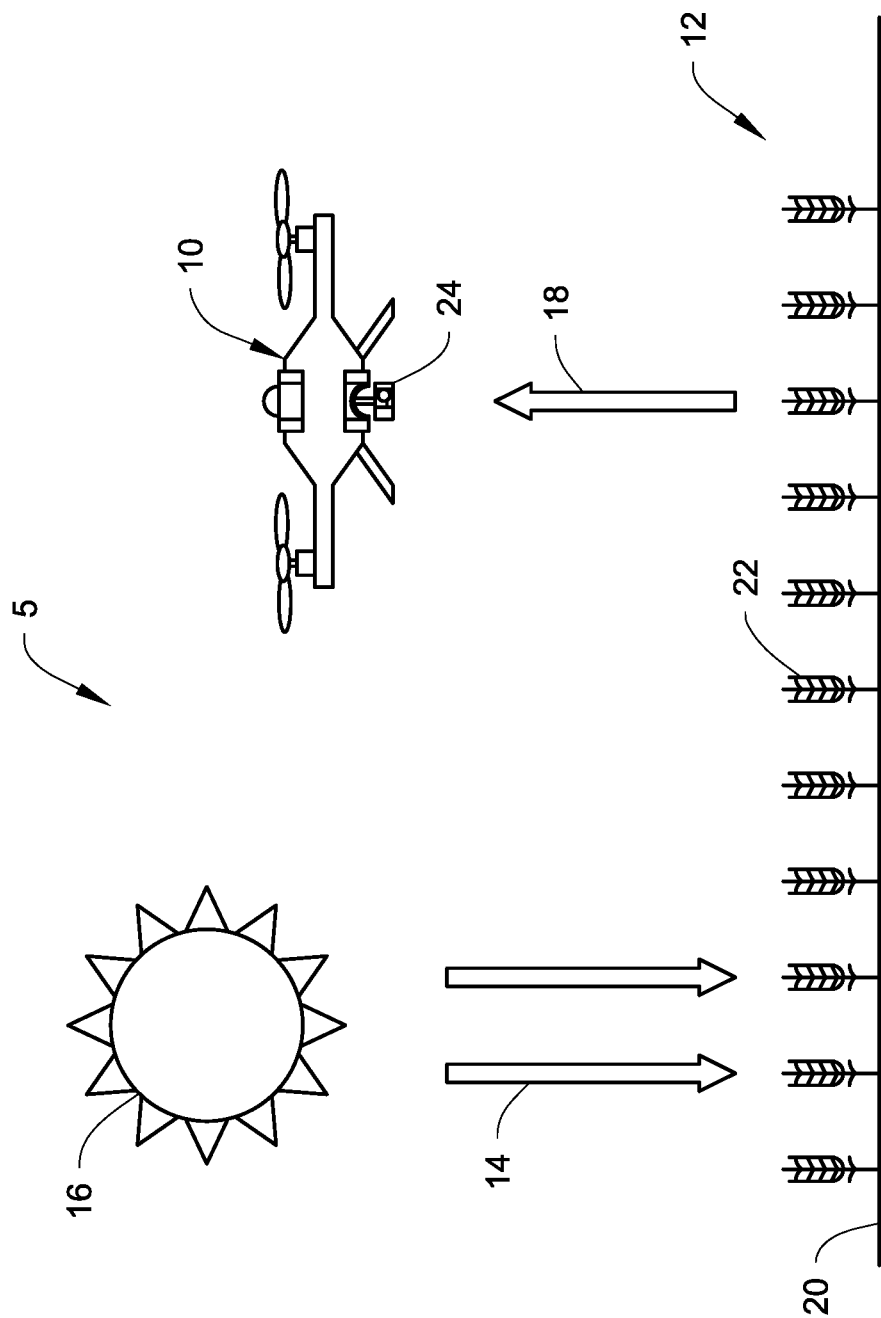

The technology described herein generally relates to imaging from aerial vehicles including, but not limited to, unmanned aerial vehicles (UAVs) using cameras.

BACKGROUND

Multispectral camera sensors have become a common tool used in aerial imaging applications such as in agricultural applications. In the case of agricultural applications, by photographing plants and isolating various color spectra, it is possible to learn more about the health of the plants than could be gained with the naked eye. However, depending on factors such as the type of plant, the growth stage of the plant, the season (for example, spring, summer, fall, winter), and the feature of the plant being detected, different spectral data could be required in order to permit a proper analysis of the plants. For example, different spectral bands are useful for different plants, different stages of plant growth, different seasons, and the like. Additionally, higher or lower resolution imagery of a plant may also be required, typically defined by ground sample distance (GSD). GSD defines how much area is covered by a single camera pixel. For example, if one is attempting to count emerging corn plants, a very low GSD is needed such that each corn plant is represented by several pixels in the resulting images. Conversely, if one is attempting to measure the overall health of a closed canopy corn field, a much larger GSD is sufficient.

SUMMARY

An aerial vehicle system is described that includes a unique imaging system, for example a camera, that reduces the size, complexity and cost of implementing an imaging system that is useful over a variety of aerial imaging applications such as, including but not limited to, in agricultural applications. For example, the imaging system is designed to be used with replaceable camera modules that have different spectral, optical and/or sensing characteristics from one another. By replacing one camera module with another camera module, different information can be gathered and analyzed.

The types of aerial vehicles that the concepts described herein can be implemented on include, but are not limited to, unmanned aerial vehicles (UAVs) such as quad-copter or quad-rotor UAVs, other rotorcraft UAVs, fixed-wing UAVs, or other types of UAVs.

In one embodiment, a system described herein includes an aerial vehicle, such as a UAV, and a camera system mounted on the aerial vehicle. The camera system includes a camera module mounting location, an interface connection located at the camera module mounting location, where the interface connection provides an interface for at least one of or both data and power, a processor electrically connected to the interface connection, and a plurality of camera modules. Each camera module can be detachably mountable in the camera module mounting location, and each camera module can electrically interface with the interface connection when mounted in the camera module mounting location to provide at least one of data and power between the interface connection and the camera module mounted in the camera module mounting location. In addition, each camera module has two or more spectral, optical and/or sensing characteristics, and the spectral, optical and/or sensing characteristics of the camera modules are different from one another. Therefore, by replacing one camera module with another camera module, the functioning of the camera system can be altered to extend the usefulness of the camera system over a variety of spectral bands, optical characteristics, and sensing capabilities.

In another embodiment described herein, a camera module of a camera system of an aerial vehicle such as a UAV is provided. The camera module can be detachably mountable in a camera module mounting location of the camera system. The camera module includes an assembly that has a lens, an optional optical filter, and a sensor, with the assembly being detachably mountable in the camera module mounting location of the camera system of the UAV. The assembly further includes an electrical interface that is connectable with an interface connection of the camera module mounting location to provide at least one of or both data and power between the interface connection and the camera module. In addition, the assembly has optical and sensing characteristics, and spectral characteristics if an optical filter is present, for the intended application of the camera system. For example, the optical, sensing and optional spectral characteristics can make the camera module suitable for imaging plants in a field. The camera module can be one of a number of similar camera modules, with each camera module having different optical, sensing and/or spectral characteristics.

In still another embodiment described herein, a method of gathering data on agricultural plants is described. The method can include detachably mounting a first camera module in a camera module mounting location of a camera system of an aerial vehicle such as a UAV, where the first camera module has first optical, sensing and/or spectral characteristics. The UAV is then flown over a field and agricultural plants are imaged using the first camera module. Thereafter, the first camera module is removed and a second camera module is installed in the camera module mounting location of the camera system of the UAV, where the second camera module has second optical, sensing and/or spectral characteristics that are different from the first optical, sensing and/or spectral characteristics. The UAV is then flown over a field, which could be the same field or a different field, and agricultural plants are imaged using the second camera module.

The camera module concepts described herein can be used in precision agriculture applications to improve farming management. For example, the camera modules can be used to image plants or crops in one or more fields and/or soil conditions in the field(s). The camera modules may also be used to image non-agricultural plants such as trees. However, the camera modules are not limited to imaging plants in agricultural or non-agricultural applications, and many other applications are possible.

DRAWINGS

FIG. 1 illustrates an example environment in which the aerial vehicle described herein can operate.

Figure 2:
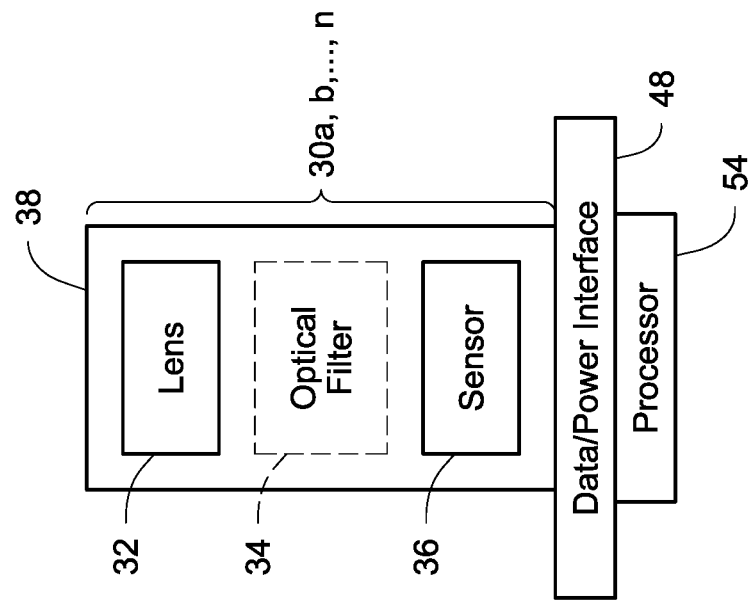

FIG. 2 schematically depicts a camera system or imaging system of the aerial vehicle.

Figure 3:
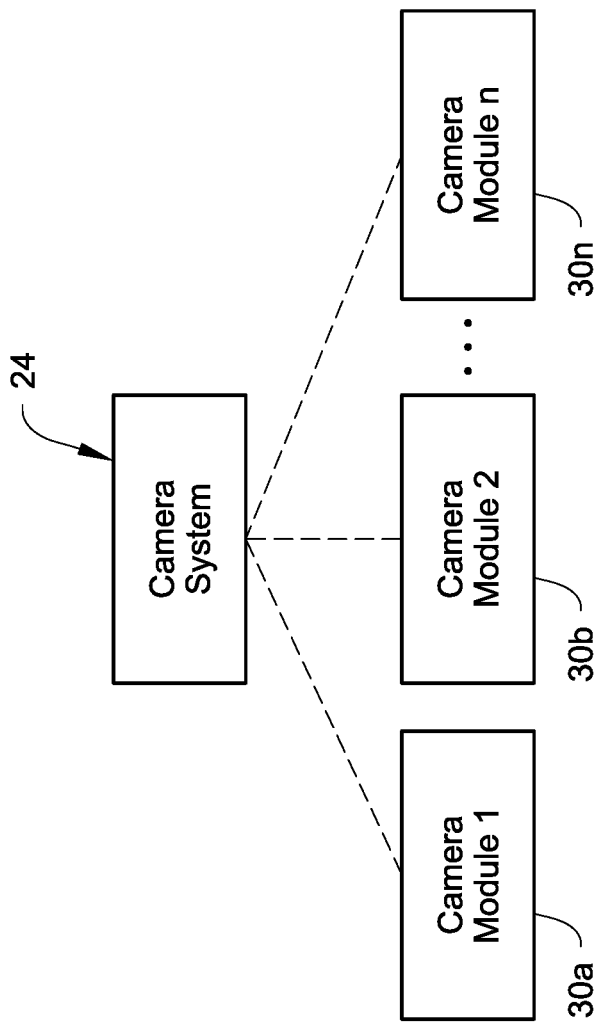

FIG. 3 schematically depicts one of the camera modules of the camera system described herein mounted to the camera system.

Figure 4:
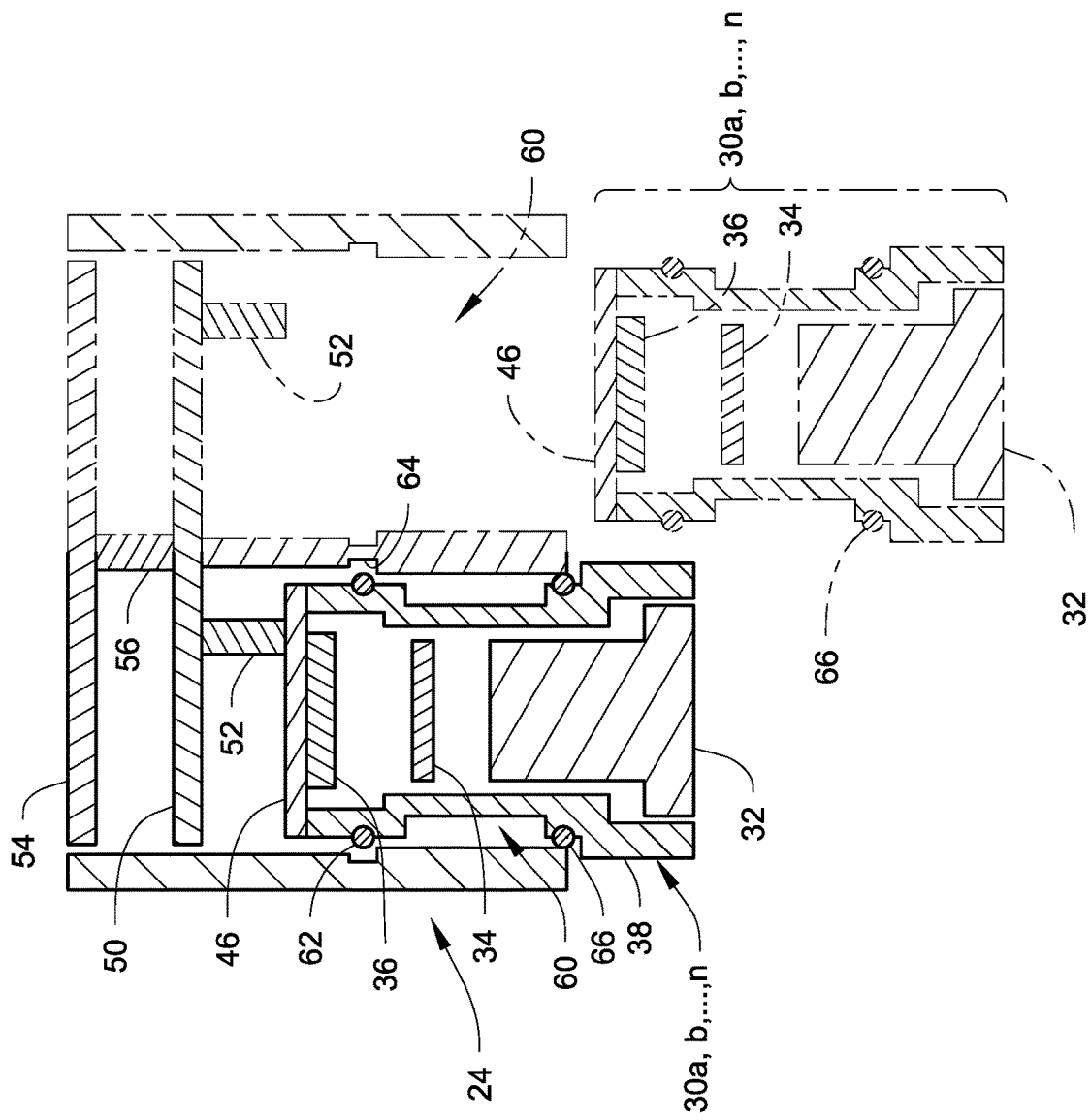

FIG. 4 schematically depicts one embodiment of mounting one of the camera modules in the camera module mounting location of the camera system.

Figure 5:
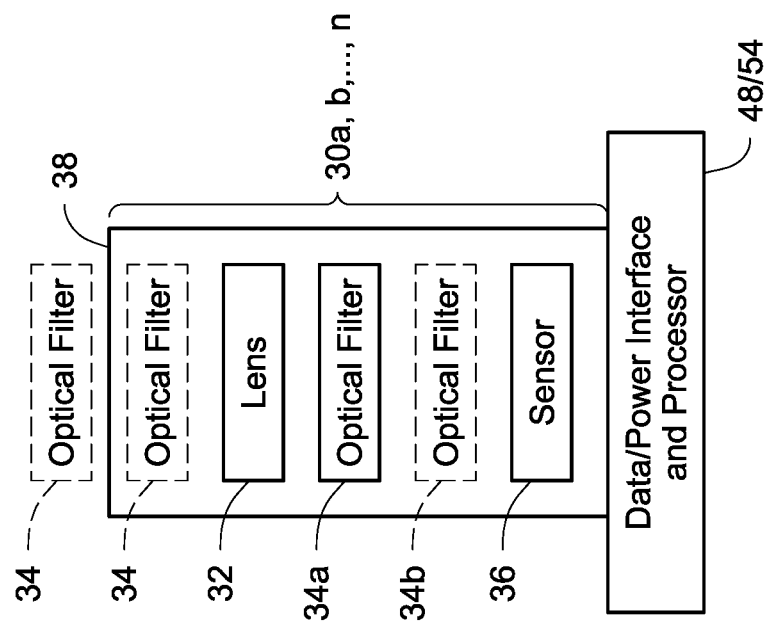

FIG. 5 schematically depicts another embodiment of a camera module mounted to the camera system.

Figure 6:
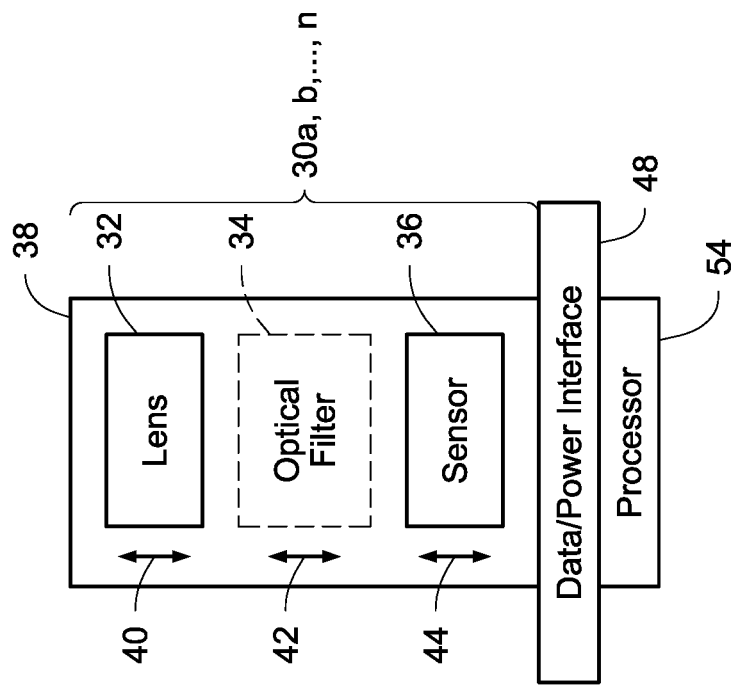

FIG. 6 schematically depicts another embodiment of a camera module mounted to the camera system.

DETAILED DESCRIPTION

Systems and methods are described where an aerial vehicle such as a UAV has a camera system (also referred to as an imaging system) that has replaceable camera modules that have different spectral, optical and/or sensing characteristics from one another. By replacing one camera module with another camera module in the camera system, different information can be gathered and analyzed when the camera system is used for imaging one or more targets.

To assist in describing the concepts herein, the aerial vehicle will be described as a UAV, and the UAV, the camera system, and the camera modules will be described as being used to image plants growing in a field(s) for precision agriculture to improve farming management. However, the UAV, the camera system, and the camera modules can be used to analyze other agronomic information, such as soil conditions, for precision agriculture to improve farming management. The UAV, the camera system, and the camera modules may also be used in non-agronomy applications for example imaging non-agricultural plants such as trees. Further, the UAV, the camera system, and the camera modules can be used in many other applications.

FIG. 1 illustrates an example environment 5 where a UAV 10 described herein can be used. In this example, a field 12 receives incident light 14, for example sunlight from the sun 16, with the incident light 14 being reflected by the field 12 (for example the soil 20, plants/crops 22 growing in the soil 20, other vegetation growing in the soil 20, etc.) in the form of reflected light 18 to a camera system 24 (also referred to as an imaging system or an image capture device) mounted on the UAV 10. The camera system 24 captures images of the field 12 which can then be analyzed to gather information about the field 12, for example the condition of the plants 22 and/or the condition of the soil 20.

FIG. 2 schematically depicts an example of the camera system 24. The camera system 24 is designed and configured to be used with a plurality of replaceable camera modules 30a, 30b, . . . 30n where the combined optical and sensing characteristics, and optionally spectral characteristics, of the camera modules are different from one another. The camera modules 30a-n, which can be considered part of the camera system 24 or not part of the camera system 24, are each detachably mountable in the camera system 24 to selectively change the optical, sensing and/or spectral characteristics of the camera system 24 by swapping out the camera modules 30a, 30b, . . . 30n.

Spectral characteristics of the camera module refers to characteristics or capabilities imparted to the camera module by one or more filter elements in the camera module. Optical characteristics of the camera module refers to characteristics or capabilities imparted to the camera module by one or more lens elements in the camera module. Sensing characteristics of the camera module refers to characteristics or capabilities imparted to the camera module by one or more sensors in the camera module.

A camera module 30a, 30b, . . . 30n as used herein is defined as an optical sub-system of the camera system 24 that is removably installable in the camera system 24 and that when installed on the camera system 24 provides unique spectral, optical, and/or sensing characteristics compared to another one of the camera modules 30a, 30b, . . . 30n. The camera system 24 may or may not have what can be considered a fixed optical system that permits the camera system 24 to perform imaging functions in addition to and separate from imaging functions performed by the removable and replaceable camera modules 30a, 30b, . . . 30n. However, the camera system 24 is configured to permit one or more of the camera modules 30a, 30b, . . . 30n to be interchangeably and selectively removably mounted thereon to permit changes in the imaging capabilities of the camera system 24 and thus of the UAV 10.

With reference to FIGS. 3 and 4, in one embodiment each one of the camera modules 30a, 30b, . . . 30n can include at least one lens 32, optionally at least one optical filter 34, at least one sensor 36, and means for transferring data and power between the camera system 24 and the camera module 30a, 30b, . . . 30n. In the illustrated embodiment, the lens 32, the optical filter 34, and the sensor 36 are combined together into a single integrated unit forming the camera module 30a, 30b, . . . 30n. The lens 32, the optical filter 34, and the sensor 36 may be combined together by being mounted together in a common housing 38 as best seen in FIG. 4. Each one of the camera modules 30a, 30b, . . . 30n can include other elements not illustrated, such as a diffuser, coatings and other elements known in the art. The lens 32, the optical filter 34, and the sensor 36 should be sealed in the housing 38 and should stay tightly coupled to maintain the intended focus and to keep debris from entering the housing 38.

In another embodiment, one or more of the camera modules 30a, 30b, . . . 30n may not include the optical filter 34 but includes the lens 32 and the sensor 36. This is indicated by the dashed lines in FIGS. 3 and 6 which indicates the optical filter 34 as being an optional component of the camera modules 30a, 30b, . . . 30n.

The lens 32 can be any type of lens having any shape and/or configuration depending upon the desired optical characteristics, such as the field of view or other optical characteristics, of the camera module 30a, 30b, . . . 30n. In one non-limiting example, the lens 32 can be a focusing lens. The lens 32 can also be provided with zoom capability and/or adjustable iris. The lens 32 can be fixed in position or the lens 32 can be adjustable in position, for example in a directed toward and/or away from the optical filter 34, as indicated by the arrow 40 in FIG. 6.

The optical filter 34, if used, can be any type of optical filtering element having any construction depending upon the desired optical filtering/spectral characteristics. For example, the optical filter 34 can be a bandpass filter that controls the spectrum of light that reaches the sensor 36 and/or the optical filter 34 can be a spectral shaping filter that shapes the light reaching the sensor 36. The optical filter 34 can be fixed in position or the optical filter 34 can be adjustable in position, for example in a directed toward and/or away from the lens 32 or toward and/or away from the sensor 36, as indicated by the arrow 42 in FIG. 6.

FIGS. 3 and 4 illustrate each camera module 30a, 30b, . . . 30n as having a single one of the optical filters 34 located a fixed distance between the lens 32 and the sensor 36. However, with reference to FIG. 5, other configurations are possible. For example, a first optical filter 34a, for example a bandpass filter, and a second optical filter 34b, for example a spectral shaping filter, can be located between the lens 32 and the sensor 36. The first optical filter 34a could be the spectral shaping filter while the second optical filter 34b could be the bandpass filter. In addition or alternatively, an optical filter 34, for example a bandpass filter or a spectral shaping filter, can be located in front the lens 32 located within the housing 38 and/or located in front of the lens 32 outside the housing 38.

Returning to FIGS. 3 and 4, the sensor 36 can be any type of sensor that can sense light impinging thereon. In one non-limiting example, the sensor 36 can be a linear or area focal plane array, formed by an array of detection elements. The detection elements can be photoresistors, photodiodes, phototransistors or any other elements suitable for being arranged in an array and for detecting electromagnetic waves. In other embodiments, the sensor 36 could be a thermal sensor. One module can employ a higher resolution rolling shutter camera and one module can employ a lower resolution global shutter camera. The term "rolling shutter" refers to the way the image sensor scans the image, where the image is scanned sequentially from one side of the sensor to the other, line by line. Many complementary metal-oxide-semiconductor (CMOS) sensors use rolling shutters. The term "global shutter" refers to sensors that scan the entire area of the image simultaneously. The vast majority of charge-coupled device (CCD) sensors employ global shutter scanning. The sensor 36 can be fixed in position or the sensor 36 can be adjustable in position, for example in a directed toward and/or away from the optical filter 34, as indicated by the arrow 44 in FIG. 6.

A suitable data/power interface 48 is provided for passing data and power between the camera modules 30a, 30b, . . . 30n and the rest of the camera system 24. The data/power interface 48 can have any construction that is suitable for passing data and power between the camera modules 30a, 30b, . . . 30n and the rest of the camera system 24. For example, referring to FIG. 4, the sensor 36 can be mounted on a sensor board 46 which forms part of the camera module 30a, 30b, . . . 30n. The sensor board 46 can include one or more power and data vias, which are known, or other electrical constructions for passing power and data through or past the sensor board 46 to the sensor 36 and any other elements of the camera modules 30a, 30b, . . . 30n. The sensor board 46 can electrically connect to a power and data distribution board 50 of the camera system 24 using one or more electrical connectors 52 that electrically interface with the vias or electrical connectors in the sensor board 46 on the backside thereof. In addition, a processor 54 of the camera system 24 that processes the images sensed by the sensor 36 and performs analytics on the images can electrically interface with the power and data interface 48, for example using one or more electrical connectors 56 that electrically interface with vias or other electrical connectors in the power and data distribution board 50 on the backside thereof. In one embodiment as illustrated in FIG. 5, the data/power interface 48 and the processor 54 can be combined into a single element.

With reference to FIG. 4, the camera system 24 is formed with one or more camera module mounting locations 60 each of which provides a location for removably mounting one of the camera modules 30a, 30b, . . . 30n to the camera system 24. A single camera module mounting location 60 can be provided, or two or more camera module mounting locations 60 can be provided. Each camera module mounting location 60 is an area on the camera 24 that each one of the camera modules 30a, 30b, . . . 30n can removably mount into, and fix the position of the camera module 30a, 30b, . . . 30n during use of the UAV 10. As depicted in FIG. 4, the power and data distribution board 50 and the processor 54 are provided at a base of each one of the camera module mounting locations 60, and the camera module 30a, 30b, . . . 30n can be installed in the camera module mounting location(s) 60 and fixed in position. When fully and properly installed, the camera module 30a, 30b, . . . 30n electrically interfaces with the power and data distribution board 50 and the processor 54 to pass power and data between the camera module 30a, 30b, . . . 30n and the camera system 24.

Any technique for removably securing each one of the camera modules 30a, 30b, . . . 30n to the camera module mounting locations 60 can be utilized. In the non-limiting example illustrated in FIG. 4, the housing 38 of each camera module 30a, 30b, . . . 30n can include a snap ring 62 that is engageable in a detent groove 64 formed on an interior wall of the camera system 24 that forms the camera module mounting location 60. Each camera module 30a, 30b, . . . 30n can further include a seal 66, for example an o-ring seal, that seals with the interior wall or other part of the camera system 24 when the camera module 30a, 30b, . . . 30n is fully and properly installed in the camera module mounting location 60 as illustrated at the right-hand side of FIG. 4 to prevent ingress of contaminants into the camera module mounting location 60.

Different ones of the camera modules 30a, 30b, . . . 30n can be created each one having its own unique combination of two or more of spectral, optical and/or sensing characteristics or properties. This can be achieved by utilizing different types of, and different combinations of, the lenses 32, optical filters 34, and/or the sensors 36. The camera modules could have different lenses 32 but the same optical filters 34 and sensors 36; different optical filters 34, but the same lenses 32 and sensors 36; different sensors 36, but the same lenses 32 and optical filters 34; different lenses 32 and optical filters 34, but the same sensors 36; different lenses 32 and sensors 36, but the same optical filter(s) 34; different optical filter(s) 34 and sensors 36, but the same lenses 32; etc. Any combination can be used as long as one or more of the spectral, optical and/or sensing characteristics of the camera modules are different so that the combined spectral, optical and/or sensing characteristics of each one of the camera modules are different from one another.

The various camera modules 30a, 30b, . . . 30n can be swapped out from the camera system 24 as needed to change the imaging capabilities of the UAV 10, while maintaining the same data/power interface board 50 and processor 54. The user can attach the appropriate camera module(s) 30a, 30b, . . . 30n, having the desired optical, sensing and/or spectral characteristics, for their specific need, for example given the plant type, growth stage, season, and desired data outcome in the case of an agricultural application. This allows the camera system 24 to be extremely versatile to support a variety of uses without the camera system 24 having to simultaneously support all optical, sensing and spectral options, thereby reducing the size, weight, and cost of the AUV 10.

The camera modules 30a, 30b, . . . 30n can be a single assembly of the lens 32, the optional optical filter 34 and the sensor 36. Or the camera modules 30a, 30b, . . . 30n can be composed of two or more assemblies, with each assembly including the lens 32, the optional optical filter 34 and the sensor 36. For example, the camera system 34 in FIG. 4 could be configured with two of the camera module mounting locations 60, and the two camera modules depicted in FIG. 4 can be paired with one another so that they are installed and/or removed as a unit (i.e. together). These paired camera modules could have a single interconnect to the data/power interface board 50, or they could utilize two independent interconnects to the data/power interface board 50. The camera system 34 can include more than two camera module mounting locations 60 receiving multiple ones of the paired camera modules, or a combination of one or more paired camera modules along with one or more individual or single camera modules.

In an agricultural application, the camera system 24 and the camera modules 30a, 30b, . . . 30n will face generally downward toward the field 12 in order to detect the reflected light 18. However, in other applications, the camera system 24 and the camera modules 30a, 30b, . . . 30n could face sideways (or generally parallel to ground) and could even face upward.

In one example application of the system described herein, a method of gathering data on agricultural plants can include detachably mounting a first one of the camera modules 30a, 30b, . . . 30n in the camera module mounting location 60 of the camera system 24 of the UAV 10, where the first camera module has first optical, sensing and optional spectral characteristics. The UAV 10 can then be flown over a field and agricultural plants imaged using the first camera module. Thereafter, the first camera module can be removed and a second one of the camera modules installed in the camera module mounting location 60 of the camera system 24, where the second camera module has second optical, sensing and optional spectral characteristics that are different from the first optical, sensing and spectral characteristics. The UAV 10 can then be flown over a field, which could be the same field or a different field, and agricultural plants can be imaged using the second camera module. A similar process can be repeated for third, fourth and any additional number of the camera modules 30a, 30b, . . . 30n.

In the example of an agricultural application, the agricultural plants imaged by the first camera module can be the same type of agricultural plants imaged by the second camera module, in either the same or different fields. The agricultural plants imaged by the first camera module can be different from the agricultural plants imaged by the second camera module, in either the same field or in different fields.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A system, comprising:
an unmanned aerial vehicle (UAV);
a camera system mounted on the UAV, the camera system includes:
a camera module mounting location for receiving a camera module;
an interface connection located at the camera module mounting location, the interface connection providing an interface for data to be passed between the camera system and a camera module mounted in the camera module mounting location and providing an interface for power to be passed from the camera system to a camera module mounted in the camera module mounting location;
a processor electrically connected to the interface connection, the processor processes data received from a camera module mounted in the camera module mounting location;
a plurality of camera modules, each camera module is detachably mountable in the camera module mounting location to change the imaging capabilities of the camera system, each camera module can electrically interface with the interface connection when mounted in the camera module mounting location to permit data to be passed between the camera system and the camera module mounted in the camera module mounting location of the camera system and permit power to be passed from the camera system to the camera module mounted in the camera module mounting location, wherein the processor of the camera system receives data through the interface connection that is obtained by the camera module mounted in the camera module mounting location and the processor processes the data, and each camera module has a sensor with sensing characteristics and one or more of:
a lens with optical characteristics; and
an optical filter with spectral characteristics.

2. The system of claim 1, wherein each camera module comprises the lens and the sensor.

3. The system of claim 2, wherein each camera module further comprises the optical filter.

4. The system of claim 3, wherein for each camera module, the optical filter comprises at least one of a bandpass filter and a spectral shaping filter.

5. The system of claim 3, wherein for each camera module, the optical filter is located between the lens and the sensor.

6. The system of claim 1, wherein there are at least three of the camera modules.

7. The system of claim 1, wherein the spectral characteristics, the optical characteristics, and the sensing characteristics of each camera module are specific to agricultural plants.

* * * * *